W. A. CAMPBELL.
TUBULAR HINGE GRATE.
APPLICATION FILED FEB. 5, 1918.

1,311,551.                                        Patented July 29, 1919.

Witnesses:
O. C. Richey
F. W. McKinnon

Inventor:
William A. Campbell

THE COLUMBIA PLANOGRAPH CO., WASHINGTON, D. C.

UNITED STATES PATENT OFFICE.

WILLIAM A. CAMPBELL, OF BELLEFONTAINE, OHIO.

TUBULAR HINGE-GRATE.

1,311,551.  Specification of Letters Patent.  Patented July 29, 1919.

Application filed February 5, 1918. Serial No. 215,493.

*To all whom it may concern:*

Be it known that I, WILLIAM A. CAMPBELL, a citizen of the United States, residing at Bellefontaine, in the county of Logan and State of Ohio, have made new and certain Improvements in Tubular Hinge-Grates Adapted to be Used in Stoves and Furnaces, of which the following is a specification.

The object of the invention is to provide means which will prevent the grate surface being deteriorated by the super-heating effect, and better operative means for removing clinkers and to make repair thereof.

The specific nature of my invention comprehends the tubular and hinge structure of a grate frame with coöperating hinge means, which may be either formed or fitted on wall of a fire chamber. The combination and detail of construction, is hereinafter described, pointed out in the appended claims and illustrated in accompanying drawings, in which the figures show the plan and connection of the operative means and the parts by reference letters.

Figure 6:
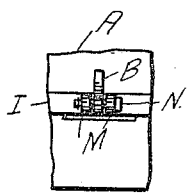
Fig. 6 is a sectional view, showing the operative hinge connection of the grate frame, with the hinge means on wall of the fire chamber.
Figure 1:
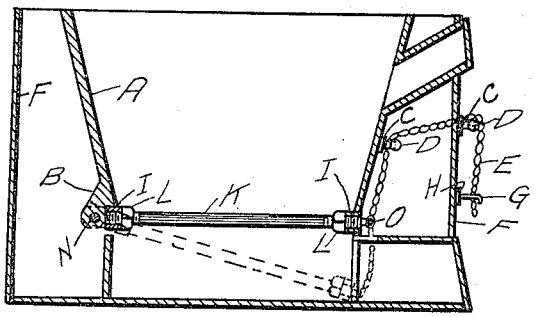
Figure 1 is a vertical section of the wall of the fire chamber with the grate frame showing the connection and the operative means.

In the figures of the drawings forming a part of this specification, A indicates the wall of the fire chamber. The hinge means connected with the wall is shown at B, which coöperate with the hinge means with the grate rim indicated by M. The coöperation is illustrated in Figs. 1 and 6.

C, and D, indicate pulley means, which are connected with the wall A, and the supplementary casing wall shown by F. E indicates the adjustable chain having operative connection with the grate rim at O, and the said pulley means, whereby the grate frame may be positioned and operated for removing the clinkers. G shows a chain lock on the casing wall, F, connected with the said casing wall by means indicated at H. The operative parts are illustrated in Fig. 1.

Figure 2:
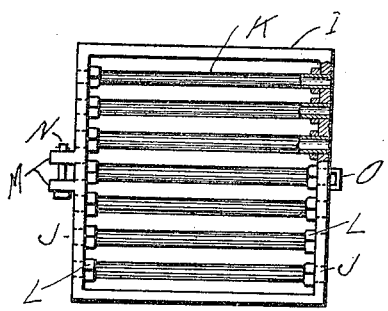
Fig. 2 shows the top view of a square grate frame.
Figure 3:
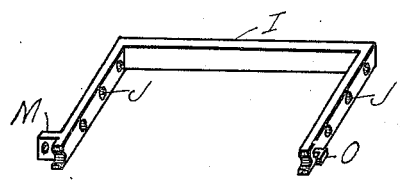
Fig. 3 is a perspective view of one-half of frame rim showing the apertures for pipe to be fitted into and the hinge means thereon.
Figure 4:
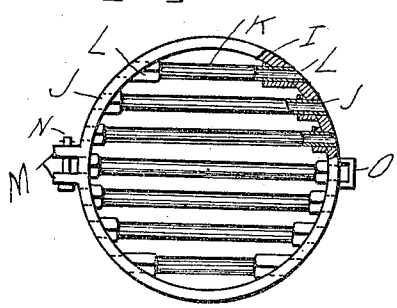
Fig. 4 is a top view of a circular grate frame.
Figure 5:
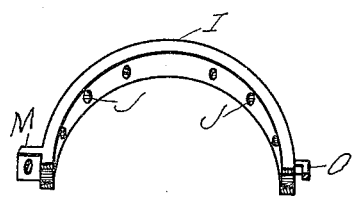
Fig. 5 is a perspective view of one-half of the circular frame rim showing the apertures for pipe and the hinge means thereon.

The tubular hinge grate frame is formed with a square or circular rim and parallel pipes. The rim of the frame is indicated by I, and the pipes by K. The rim has apertures denoted by J, into which the pipes are to be fitted and secured together by swage or nut and threaded means shown by L. The grate rim has operative hinge means thereon indicated by M, which means have coöperation with the hinge means on the wall of the fire chamber. The said hinge means being connected by a hinge pin shown at N. The grate frame is illustrated in Figs. 2 and 4.

By the novel plan of the grate construction, the interior of the pipe is ventilated, moderating the heat effect upon it; and the operative function of utility provides better facility.

Having described and illustrated the nature, construction and operation of my invention, the merits and novelty of which will be apparent,

What I claim and desire to secure by Letters Patent is—

1. In a tubular hinge grate of the nature described in combination, a grate composed of a rim provided with oppositely disposed apertures spaced apart and with hinge means thereon, of parallel tubes the ends inserted in the said apertures, means for locking the tubes to the said rim, a chain secured to the said rim, pulleys suitably mounted on the stove and casing walls with which said chain may operate, a lock hook suitably mounted on the said walls to secure the said chain, of hinge means formed or fitted on the fire chamber, the hinge means on the said rim and said chamber having operative connection and with the said chain and pulleys and lock hook, whereby the said grate may be positioned and operated as and for the purposes set forth.

2. In a tubular hinge grate of the character described in combination with hinge means formed or fitted on a fire chamber wall, a grate composed of a rim provided with oppositely disposed apertures spaced apart and hinge means thereon, of parallel tubes, the ends inserted in the said apertures, means for locking the tubes to the said rim, of a chain connecting the said rim, of pulleys suitably mounted on stove and casing walls, over which the said chain may be operated, of a lock hook suitably mounted on the said walls for locking the said chain, the hinge means of the said fire chamber and the said rim having operative connection and the said chain, pulleys and lock hook having operative connection with the said rim whereby the said grate may be positioned and operated as and for the purposes set forth.

3. In a tubular hinge grate of the character described, in combination, a fire chamber wall having hinge means and pulley mounted thereon: of a casing wall having pulley and lock hook suitably mounted thereon: of a grate frame formed of a rim having hinge means and oppositely disposed apertures spaced apart, parallel tubes the ends inserted in the said apertures, means for locking the tubes to said rim, the said frame having hinge operation with the said chamber wall; of a chain having connection with the said rim and with the said pulley and lock hook, whereby the said frame may be positioned and operated; as and for the purposes set forth.

4. In a tubular hinge grate of the character described, in combination, of a casing wall having a pulley and a lock hook suitably mounted thereon; of a fire chamber wall provided with hinge and pulley means, of a grate frame formed of a rim having hinge means and oppositely disposed apertures spaced apart, parallel tubes the ends inserted in the said apertures, means for locking the tubes in the said rim, the said frame hinged to the wall of said fire chamber; of a chain connecting the said rim and operating over the said pulley and secured by the said lock hook whereby the grate may be operated and positioned; as and for the purposes set forth.

In testimony whereof I affix my signature to said specification and claims in the presence of two witnesses.

WILLIAM A. CAMPBELL.

Witnesses:
ETHEL L. MITCHELL,
C. M. CLAY.

Copies of this patent may be obtained for five cents each, by addressing the "Commissioner of Patents, Washington, D. C."